US012769680B2

(12) United States Patent
Norberg et al.

(10) Patent No.: US 12,769,680 B2
(45) Date of Patent: Oct. 20, 2026

(54) I/O STATION STORING CONFIGURATION DATA

(71) Applicant: ABB Schweiz AG, Baden (CH)

(72) Inventors: Robert Norberg, Eskilstuna (SE); Johan Wennerberg, Västerås (SE); Stefan Pook, Minden (DE); Ralf Jeske, Petershagen (DE)

(73) Assignee: ABB Schweiz AG, Baden (CH)

( * ) Notice: Subject to any disclaimer, the term of this patent is extended or adjusted under 35 U.S.C. 154(b) by 42 days.

(21) Appl. No.: 18/830,206

(22) Filed: Sep. 10, 2024

(65) Prior Publication Data

US 2025/0103527 A1 Mar. 27, 2025

(30) Foreign Application Priority Data

Sep. 25, 2023 (EP) .................................... 23199404

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
None
See application file for complete search history.

(56) References Cited

U.S. PATENT DOCUMENTS 7,043,569 B1 * 5/2006 Chou .................. G06F 13/4031 710/10
7,181,550 B2 * 2/2007 Shepard ............... G05B 19/042 710/72
8,316,158 B1 * 11/2012 Wright ...................... G05F 1/46 710/1
8,332,567 B2 * 12/2012 Burr ................... G05B 19/4185 710/25
9,727,511 B2 * 8/2017 Markovic ............... H04L 63/08
11,424,865 B2 * 8/2022 Nixon ................... H04L 1/1642
11,687,397 B2 * 6/2023 Watanabe ............. G06F 11/079 714/37
12,282,313 B2 * 4/2025 Haridas ............ G05B 19/41855
2018/0173860 A1 6/2018 Mori
2018/0357185 A1 12/2018 Ratilla et al.
2019/0346818 A1 11/2019 Chung et al.
2020/0264593 A1 8/2020 Rudaitis
2022/0404789 A1 12/2022 Amaro, Jr. et al.

FOREIGN PATENT DOCUMENTS

EP 3722898 B1 7/2022

OTHER PUBLICATIONS

European Extended Search Report for Application No. 23199404.7, dated Mar. 11, 2024, 9 pages.

* cited by examiner

*Primary Examiner* — Elias Mamo
(74) *Attorney, Agent, or Firm* — McCarter & English, LLP

(57) ABSTRACT

The present disclosure relates to an I/O station, connected with a plurality of network devices in an automation system. The station comprises a plurality of I/O modules, each I/O module providing one or more I/O channels connecting respective one or more field device(s). The station also comprises an I/O network interface for forwarding data between the modules and the network devices via a network. Each of the channels connecting a respective field device is communicatively connected to at least one of the network devices via the network. The station further comprises a non-volatile storage storing configuration data for the station.

19 Claims, 3 Drawing Sheets

I/O STATION STORING CONFIGURATION DATA

CROSS-REFERENCE TO RELATED APPLICATIONS

This application claims priority to European Patent Application No. 23199404.7, filed Sep. 25, 2023 and titled "I/O STATION STORING CONFIGURATION DATA", the contents of which is hereby incorporated by reference in its entirety.

TECHNICAL FIELD

The present disclosure relates to an input-output (I/O) station, connected with a plurality of network devices in an industrial automation system.

BACKGROUND

An I/O station, also called I/O system, is used in an industrial automation system for connecting field devices, such as sensors, actuators or the like in an industrial plant to controllers of the plant. The I/O station typically comprises a Fieldbus Communication Interface (FCI) and I/O modules connecting the field devices, where the FCI interface is arranged for forwarding data between the modules and the controllers, via fieldbus or fieldbus network. Since the controllers are digital while at least some of the field devices may be analog legacy devices (e.g. requiring a 4-20 mA signal), the I/O station may convert analogue signals to digital and vice versa. Each of the I/O modules may be any of a digital-in (DI) module, digital-out (DO) module, analog-in (AI) module or analog-out (AO) module, or a combination thereof.

For configuring an I/O station, e.g. at first start-up or after a power outage, an engineering tool may be connected to the I/O station, e.g. via the fieldbus. The engineering tool is typically a computing device, e.g. a PC, of a human operator of the automation system by means of which the operator can configure the I/O station, e.g. via engineering services installed on the engineering tool.

BRIEF DESCRIPTION

It is an objective of the present disclosure to provide an improved I/O station which can be configured more easily.

According to an aspect of the present disclosure, there is provided an I/O station, connected with a plurality of network devices in an automation system. The I/O station comprises a plurality of I/O modules, each I/O module providing one or more I/O channels connecting respective one or more field device(s). The station also comprises an I/O network interface for forwarding data between the modules and the network devices via a network. Each of the I/O channels connecting a respective field device is communicatively connected to at least one of the network devices via the network. The I/O station further comprises a non-volatile storage storing configuration data for the I/O station.

According to another aspect of the present disclosure, there is provided an automation system comprising a plurality of network devices, a plurality of the I/O station of the present disclosure, and the network via which the I/O stations are communicatively connected to the network devices.

According to another aspect of the present disclosure, there is provided a method of configuring an embodiment of the I/O station of the present disclosure. The method comprises obtaining the configuration data from the storage in the I/O station, and configuring the I/O station in accordance with the obtained configuration data, including re-establishing a previously lost communication connection with at least one of the network devices, e.g. at least one controller.

By the I/O station storing (all or at least some of) its own configuration data, the I/O station is enabled to configure itself, e.g. independently of the network or in cooperation with a network device but at the initiative of the I/O station. Thus, e.g. after a power outage or other loss of connection to the network or a network device, the I/O station can configure itself or at least initiate such configuration, saving time and reducing downtime, as well as reducing complexity of any controller associated with the I/O station. The topology of the I/O station (i.e. which of the I/O channels is connecting which of the field devices is the same before and after the configuring, so there is no re-configuration in that sense but rather an improved way of getting the I/O station up and running again after a disturbance.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description. That two devices are said to be "communicatively connected" herein imply that they are connected such that they are able to communicate with each other, e.g. wirelessly or non-wirelessly.

Figure 1:
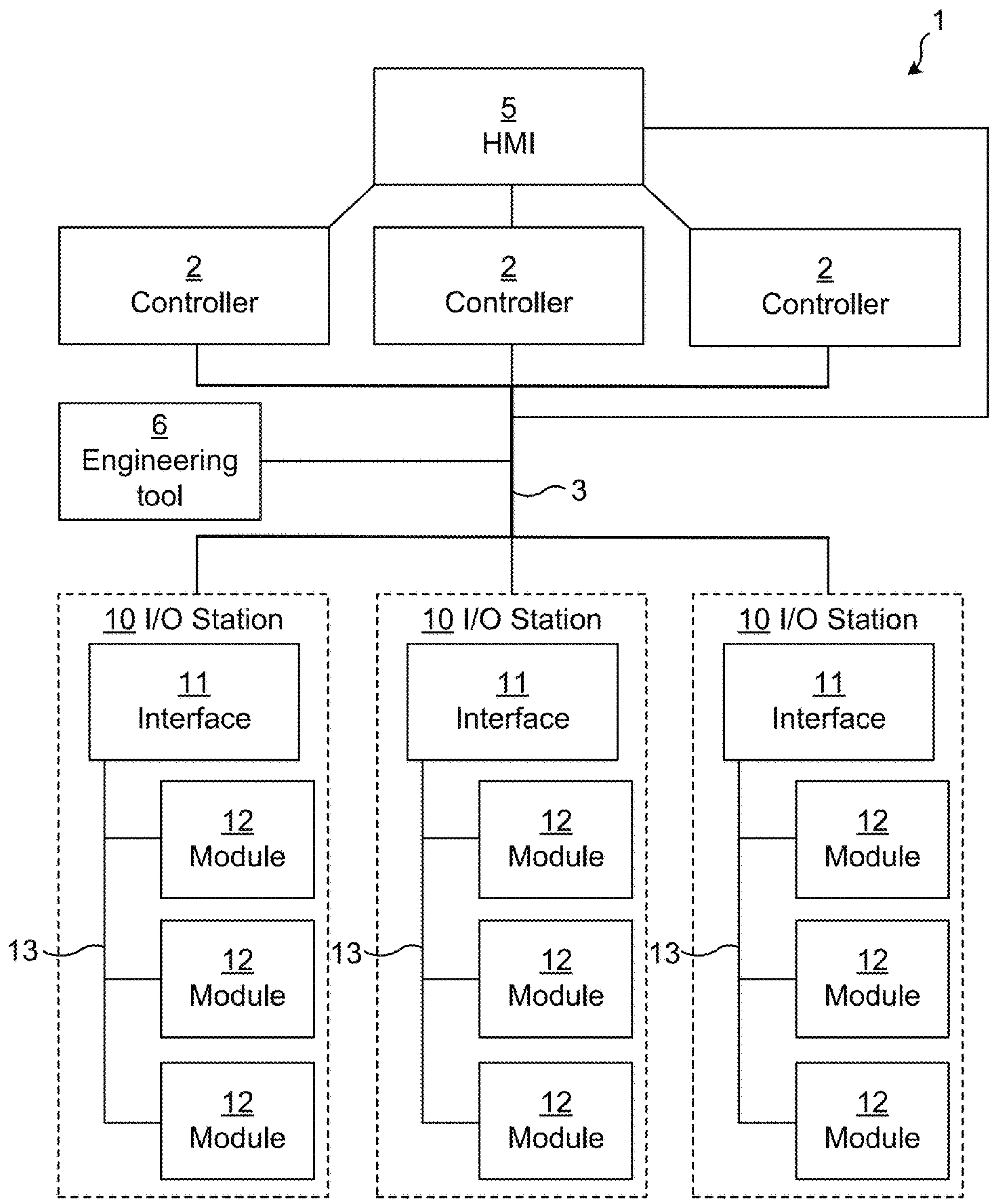
FIG. 1 is a schematic block diagram of an automation system, in accordance with some embodiments of the present disclosure.

FIG. 1 illustrates an automation system 1 comprising a plurality of I/O stations 10. An I/O station may be embedded hardware and software that, for inputs converts the physical signal from the process running in the plant (either directly from the process or via a field device) to digital values, and for outputs converts digital values into physical signals for the process (either directly to the process or via a field device). The I/O stations 10 are connected with a plurality of network devices via a network 3. The network may comprise one or more fieldbus(es). The network 3 may be configured for communication in accordance with an OPC Unified Architecture, OPC UA, communication protocol.

The network devices may comprise any of one or more, e.g. a plurality of, controller(s) 2, one or more, e.g. only one, Human-Machine Interface(s) (HMI) 5 and/or one or more, e.g. only one, engineering tool(s) 6. A controller 2 may be embedded hardware and software that executes a real-time plant process specific application that e.g. reads signals from the I/O stations 10, writes signals to the I/O stations 10 and/or receives commands from an HMI 5. An HMI 5 may convene to an operator the status of the process based on reading data from the controller(s) 2 and/or the I/O stations 10. The HMI 5 may additionally command a controller 2 to start an action. An engineering tool 6 may configure the binding and conversion of I/O channels of an I/O station 10 and/or the application in a controller 2. The engineering tool 6 may execute on a PC where activities are not time critical.

In the example of FIG. 1, there are three I/O stations 10 and three controllers 2. However, there need not be a one-to-one relationship between the number of I/O stations and the number of controllers and any one of the controllers may connect with any of the I/O channels in any of the I/O stations. In some embodiments, at least one of the network devices 2, 5 and/or 6, e.g. at least one controller 2, may be communicatively connected (i.e. connected such that it is able to communicate, e.g. wirelessly or non-wirelessly) with I/O channels of at least two of the I/O stations 10.

In the example of FIG. 1, the controllers 2 are connected between the I/O stations 10 and the HMI 5. For example, the HMI 5 may be connected directly to the stations 10, without being connected via a controller. However, other topologies are possible. The engineering tool 6 may be connected to any or all of the I/O stations 10, and/or to any of the controllers 2, e.g. via the network 3. Typically, the engineering tool 6 is only connected when needed, but in some embodiments it may be permanently connected.

Each of the I/O stations 10 comprises a plurality of I/O modules 12 which are interfaced with the network 3 via an I/O network interface 11. The modules 12 may be connected to the network interface 11 via one or more I/O bus(es) 13 within the station 10, and/or there may be point-to-point connections between the modules 12 and network interface 11.

Figure 2:
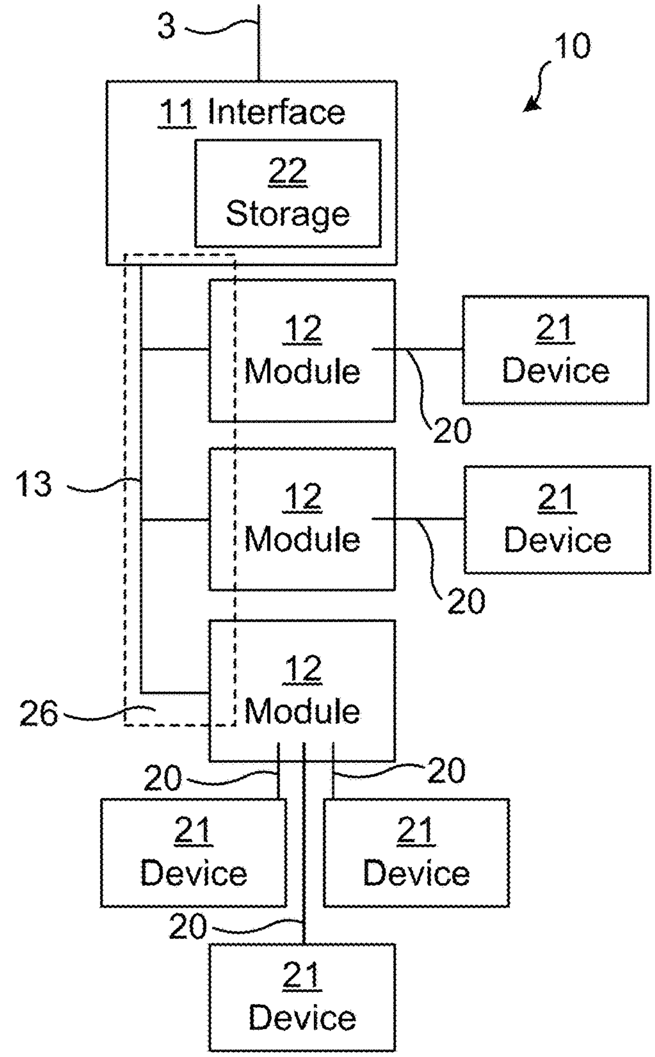
FIG. 2 is a schematic block diagram of an I/O station, in accordance with some embodiments of the present disclosure.

FIG. 2 illustrates an I/O station 10, e.g. one of the stations 10 in FIG. 1, connecting a plurality of field devices 21. Each module 12 provides one or more I/O channel(s) 20, where each channel 20 can connect a respective field device 21 (i.e. one device per channel and one channel per device). In an example, one of the modules 12 provides only one channel 20 and may thus be able to connect only one field device 21. In another example, one of the modules 12 provides 16 channels 20, enabling the module to connect up to 16 field devices 21. There may be unused channels 20 (i.e. channels to which no field device is connected), but each of the channels 20 which connects a field device 21 is communicatively connected to at least one of the network devices, e.g. one or more controllers 2, via the network interface 11 and the network 3.

The modules 12 and/or the network interface 11 may be mechanically connected to one or more baseplate(s) 26 within the station 10. In some embodiment a single baseplate 26 provides slots for mechanically connecting the modules 12 and the network interface 11. In other embodiments that functionality is provided by a plurality of modular baseplates 26, one of which providing a slot for mechanically connecting the network interface 11.

The station 10 comprises a non-volatile data storage 22 storing configuration data for configuring the station. In some embodiments, the storage 22 is comprised in the network interface 11. In some embodiments, the storage is comprised in the baseplate 26, e.g. in a baseplate mechanically connecting the network interface 11.

Figure 3:
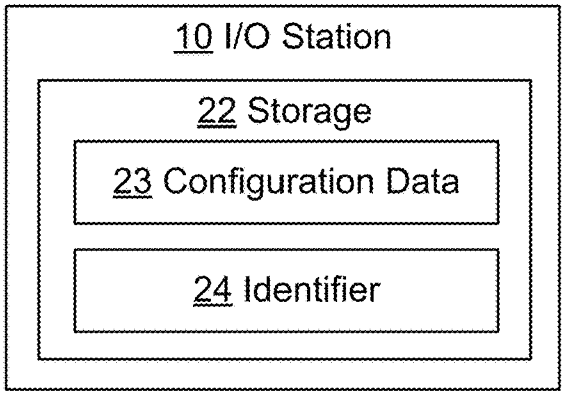
FIG. 3 is a schematic block diagram of a storage in an I/O station, in accordance with some embodiments of the present disclosure.

FIG. 3 illustrates a non-volatile data storage 22 arranged in the station 10. Configuration data 23 for configuring the station 10 is stored in the storage 22. The stored configuration data 23 enables the station 10 to configure itself when needed, or at least to initiate such configuration. In some embodiments, the stored configuration data 23 comprises or consists of all the configuration data needed for configuring the station 10, in which case there is no need for the station 10 to cooperate with any network device, e.g. a controller 2 or engineering tool 6 for configuring the station. In some other embodiments, the stored configuration data 23 may enable the station 10 to initiate its own configuration, e.g. including enabling the station to obtain further configuration data from a network device, e.g. a controller 2 or engineering tool 6 for completing the configuring of the station.

Since the topology of the station 10 is static, i.e. the same before and after the configuring of the station by using the stored configuration data 23, implying that the same field devices 21 are connected to the same channels 20, the stored configuration data 23 is typically specific for the station 10 as it is when connected to the same field devices 21 by the same channels 20. In some embodiments, the stored configuration data 23 may be regarded as comprising a set of configuration data, where only one set is needed for configuring the station 10 since the topology is static. There is no switching between different configurations of the station 10 when the station is configured using the stored configuration data 23. If it is determined that the topology of the station has changed before the configuring, e.g. during a power outage or other connection loss, the I/O station may not be configured by means of the stored configuration data, or at least not only the stored configuration data. Instead, configuration data for the configuring may in that case be obtained from a network device e.g. an engineering tool.

In some embodiments, the storage 22 also stores an identifier 24 of the station 10, typically a unique identifier 24. The identifier 24 may be used in communication with any of the network devices for identifying the station 10 with the network device. For example, the station 10 may send the stored identifier 24 to the engineering tool 6 in a request for configuration data from the engineering tool. By the identifier 24, identifying the station 10 to the engineering tool 6, the engineering tool 6 may then determine what configuration data to send to the station 10. The engineering tool 6 may e.g. determine from which engineering service 25 (see FIG. 4) to send the requested configuration data. In some embodiments, the configuring of the station 10 using the stored configuration data 23 may comprise requesting supplemental configuration data from the engineering tool by means of the stored identifier 24, whereby also the supplemental configuration data received from the engineering tool 6 may be used when configuring the station 10. Additionally or alternatively, before or after the configuring of the station 10, the station may request updated configuration data from the engineering tool 6 by means of the stored identifier 24, whereby the stored configuration data 23 may be updated (e.g. replaced with) the updated configuration data received from the engineering tool 6. Thus, the stored configuration data 23 may be kept up to date. Similarly, further configuration data, such as supplemental and/or updated configuration data as discussed herein, may be requested from any other network device (other than an engineering tool 6), e.g. from a controller 2 or from an HMI 5.

Figure 4:
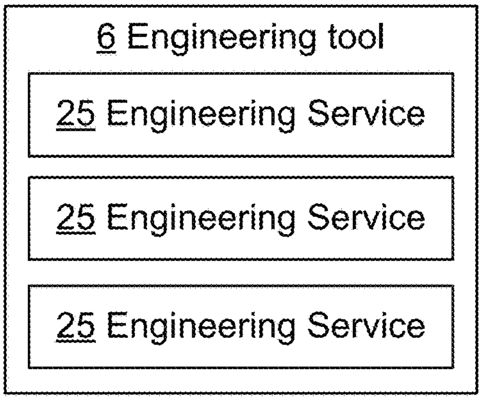
FIG. 4 is a schematic block diagram of an engineering tool, in accordance with some embodiments of the present disclosure.

FIG. 4 illustrates an engineering tool 6 which comprises a plurality of engineering services 25. Each service 25 may be dedicated to e.g. a respective station 10 or controller 2.

Figure 5:
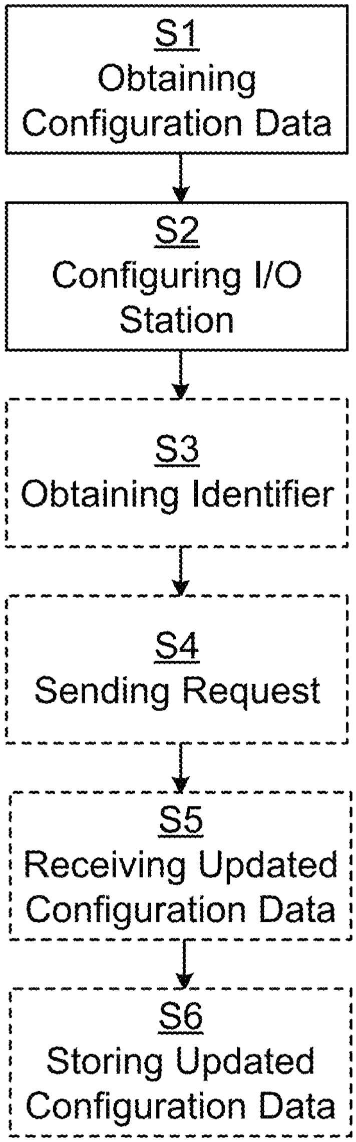
FIG. 5 is a schematic flow chart of some embodiments of the method of the present disclosure.

FIG. 5 illustrates some embodiments of the method performed in the station 10 for configuring the I/O station 10 of the present disclosure. The configuration data 23 is obtained S1 from the storage 22 in the I/O station 10. Then, the station 10 is configured S2 in accordance with the obtained S1 configuration data 23, including re-establishing a previously lost communication connection with at least one of the network devices 2, 5 and/or 6, e.g. at least one controller 2.

In some embodiments of the present disclosure, the configuring S2 of the I/O station 10 further comprises obtaining an identifier 24 of the I/O station from the storage 22 in the I/O station 10, and sending a request for supplemental configuration data to an engineering tool 6 connected to the network 3, the request comprising the obtained identifier 24. In response to the sent request, supplemental configuration data is then received from the engineering tool 6. The station 10 may then be configured S2 in accordance with both the obtained S1 stored configuration data and the supplemental configuration data received from the engineering tool 6. In this case, not all configuration data needed for configuring the station 10 need to be stored in the storage 22, but the station can request the rest from the engineering tool.

Additionally or alternatively, before or after the configuring S2 of the station 10, the station may in some embodiments of the present disclosure request and store updated configuration data from the engineering tool 6. Thus, the method may comprise obtaining S3 an identifier 24 of the I/O station from the storage 22 in the I/O station 10, and sending S4 an update request to an engineering tool 6 connected to the network 3, the update request comprising the obtained S3 identifier 24. In response to the sent S4 update request, the station 10 then receives S5 updated configuration data from the engineering tool 6, and stores S6 the updated configuration data 23 in the storage 22.

In some embodiments of the present disclosure, the configuring S2 is in response to a loss of connection between the I/O station 10 and the at least one of the network devices 2, 5 and/or 6, e.g. due to a power outage affecting the I/O station.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. An input-output (I/O) station configured to connect with a plurality of network devices in an automation system, wherein the network devices include any of: one or more controllers, one or more human-machine interfaces and one or more engineering tools, the I/O station comprising:

one or more base plates comprising a first plurality of slots and a second slot different from the first plurality of slots;

a plurality of I/O modules, each I/O module disposed in one of the first plurality of slots and configured to provide one or more I/O channels that connect respective one or more field devices; and an I/O network interface disposed in the second slot and configured to forward data between the plurality of I/O modules and the plurality of network devices via a network, wherein each of the I/O channels that connects a respective field device is communicatively connected to at least one of the plurality of network devices via the network, and wherein the I/O station further comprises a non-volatile storage configured to store configuration data for the I/O station.

2. The I/O station of claim 1, wherein the non-volatile storage is included in the I/O network interface.

3. The I/O station of claim 1, wherein the configuration data stored in the non-volatile storage comprises or consists of all the configuration data needed for configuring the I/O station.

4. The I/O station of claim 1, wherein the non-volatile storage is further configured to store a unique identifier of the I/O station.

5. The I/O station of claim 1, wherein the I/O network interface is configured to forward the data via the network in accordance with an OPC Unified Architecture (OPC UA) communication protocol.

6. The I/O station of claim 1, wherein the stored configuration data is specific for the I/O station as connected to the one or more field devices.

7. The I/O station of claim 1, wherein the stored configuration data is one, and only one, set of configuration data.

8. An automation system comprising:

a plurality of network devices, wherein the network devices include any of: one or more controllers, one or more human-machine interfaces and one or more engineering tools;

a plurality of input-output (I/O) stations, each connected with the plurality of network devices, wherein each I/O station comprises:

one or more base plates comprising a first plurality of slots and a second slot different from the first plurality of slots;

a plurality of I/O modules, each I/O module disposed in one of the first plurality of slots and configured to provide one or more I/O channels that connect respective one or more field devices; and an I/O network interface disposed in the second slot and configured to forward data between the plurality of I/O modules and the plurality of network devices via a network, wherein each of the I/O channels that connect a respective field device is communicatively connected to at least one of the plurality of network devices via the network, and wherein the I/O station further comprises a non-volatile storage configured to store configuration data for the I/O station; and the network via which the plurality of I/O stations are communicatively connected to the plurality of network devices.

9. The automation system of claim 8, wherein at least one of the plurality of network devices is communicatively connected with I/O channels of at least two of the I/O stations.

10. A method of configuring an input-output (I/O) station connected with a plurality of network devices in an automation system, wherein the network devices include any of: one or more controllers, one or more human-machine interfaces and one or more engineering tools, wherein:

the I/O station comprises:

one or more base plates comprising a first plurality of slots and a second slot different from the first plurality of slots;

a plurality of I/O modules, each I/O module disposed in one of the first plurality of slots and configured to provide one or more I/O channels that connect respective one or more field devices; and an I/O network interface disposed in the second slot and configured to forward data between the plurality of I/O modules and the plurality of network devices via a network, wherein each of the I/O channels that connect a respective field device is communicatively connected to at least one of the plurality of network devices via the network, and wherein the I/O station further comprises a non-volatile storage configured to store configuration data for the I/O station, and the method comprises:

obtaining the configuration data from the non-volatile storage in the I/O station; and configuring the I/O station in accordance with the obtained configuration data, including re-establishing a previously lost communication connection with at least one of the plurality of network devices.

11. The method of claim 10, wherein the configuring of the I/O station further comprises:

obtaining an identifier of the I/O station from the non-volatile storage in the I/O station;

sending a request for supplemental configuration data to the one or more engineering tools connected to the network, the request comprising the obtained identifier; and in response to sending the request, receiving the supplemental configuration data from the one or more engineering tools, wherein the I/O station is further configured in accordance with the received supplemental configuration data.

12. The method of claim 10, further comprising:

obtaining an identifier of the I/O station from the non-volatile storage in the I/O station;

sending an update request to the one or more engineering tools connected to the network, the update request comprising the obtained identifier;

in response to sending the update request, receiving updated configuration data from the one or more engineering tools; and storing the updated configuration data in the non-volatile storage.

13. The method of claim 10, wherein the configuring of the I/O station is in response to a loss of connection between the I/O station and the at least one of the plurality of network devices.

14. The I/O station of claim 7, wherein the stored configuration data is specific for the I/O station as connected to the one or more field devices.

15. The automation system of claim 9, wherein at least one controller is communicatively connected with the I/O channels of at least two of the I/O stations.

16. The method of claim 10, wherein configuring the I/O station in accordance with the obtained configuration data includes re-establishing the previously lost communication connection with at least one controller.

17. The method of claim 13, wherein configuring the I/O station is performed in response to a power outage affecting the I/O station.

18. The I/O station of claim 1, wherein the non-volatile storage is included in the one or more base plates that provides the second slot to which the I/O network interface is mechanically connected in the I/O station.

19. The I/O station of claim 2, wherein the non-volatile storage is also included in the one or more base plates that provides the second slot to which the I/O network interface is mechanically connected in the I/O station.

* * * * *